(12) United States Patent
Xu et al.

(10) Patent No.: US 8,396,169 B2
(45) Date of Patent: Mar. 12, 2013

(54) CHANNEL ESTIMATION METHOD OF THE MOBILE COMMUNICATION SYSTEM BASED ON THE TIME DIVISION PILOT FIELD

(75) Inventors: Guoping Xu, Shenzhen (CN); Yu Xin, Shenzhen (CN); Liang Ren, Shenzhen (CN); Xin Zhang, Shenzhen (CN); Dacheng Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 604 days.

(21) Appl. No.: 12/667,610

(22) PCT Filed: Nov. 16, 2007

(86) PCT No.: PCT/CN2007/003247
§ 371 (c)(1),
(2), (4) Date: Jan. 4, 2010

(87) PCT Pub. No.: WO2009/003327
PCT Pub. Date: Jan. 8, 2009

(65) Prior Publication Data
US 2010/0197237 A1    Aug. 5, 2010

(30) Foreign Application Priority Data
Jul. 4, 2007    (CN) .......................... 2007 1 0075806

(51) Int. Cl.
*H04L 27/06*    (2006.01)

(52) U.S. Cl. ........ 375/340; 375/136; 375/147; 375/229; 375/260; 375/262; 375/267; 375/343; 375/346; 375/350

(58) Field of Classification Search .................. 375/340, 375/136, 147, 229, 260, 262, 267, 343, 346, 375/350; 455/67.11, 130; 370/203, 208, 370/209, 210
See application file for complete search history.

(56) References Cited

U.S. PATENT DOCUMENTS

| | | | |
|---|---|---|---|
| 2005/0157801 A1* | 7/2005 | Gore et al. | 375/260 |
| 2006/0203710 A1* | 9/2006 | Mukkavilli et al. | 370/208 |
| 2006/0221810 A1* | 10/2006 | Vrcelj et al. | 370/208 |

FOREIGN PATENT DOCUMENTS

| | | |
|---|---|---|
| CN | 1527513 A | 9/2004 |
| CN | 1747462 | 3/2006 |
| CN | 1909526 A | 2/2007 |
| JP | (H19) 2007013310 A | 1/2007 |
| KR | 20060001646 A | 1/2006 |

* cited by examiner

*Primary Examiner* — Dhaval Patel
(74) *Attorney, Agent, or Firm* — Bright IP Law Offices

(57) ABSTRACT

A method of channel estimation of a mobile communication system based on a time division pilot field is disclosed. The method uses a transmitting end that transmits a time division pilot sequence having a cyclic prefix and a receiving end that transforms the time division pilot sequence into frequency domain using a fast Fourier transform module. Channel estimation is performed to obtain a channel frequency response estimation result. The receiving end transforms the channel frequency response estimation result back into time domain and obtains a channel impulse response estimation result.

8 Claims, 2 Drawing Sheets

| Tap | Vehicle-loaded channel A | |
|---|---|---|
| | Relative delay/ns | Average power/dB |
| 1 | 0 | 0 |
| 2 | 310 | -1.0 |
| 3 | 710 | -9.0 |
| 4 | 1090 | -10.0 |
| 5 | 1730 | -15.0 |
| 6 | 2510 | -20.0 |

CHANNEL ESTIMATION METHOD OF THE MOBILE COMMUNICATION SYSTEM BASED ON THE TIME DIVISION PILOT FIELD

FIELD OF INVENTION

The present invention relates to communication system, and in particular to a channel estimation method of the mobile communication system based on the time division pilot field.

BACKGROUND OF THE INVENTION

Channel estimation technology can generally be classified into non-blind estimation and blind estimation, and semi-blind estimation derived from them. Generally, using the non-blind estimation can realize better effect with lower calculation complexity, thus it is more facilitated to follow the change of a wireless channel, therefore the receiver performance can be improved. Commonly, a great volume of matrix computation has to be processed while using the traditional channel estimation method, resulting in higher complexity and longer time delay for processing.

For example, in a Code Division Multiple Access (CDMA) wireless communication system, due to high transmission rate, the Coherent Detection technology is required to be used to obtain comparatively high performance, thus channel estimation becomes an important aspect of the investigation relating to CDMA. Precise channel estimation can improve the performance of a CDMA system, and the results of channel estimation can be applicable to the RAKE receiver, the time domain equalization receiver, and the frequency domain equalization receiver of a CDMA system. However, the prior art does not provide a channel estimation method performing fast and precise calculation.

SUMMARY OF THE INVENTION

In view of the above problem, the present invention provides a channel estimation method of mobile communication system based on time division pilot field, wherein a pilot sequence having a cyclic prefix (CP) is utilized to perform channel estimation in frequency domain. The channel estimation based on Fast Fourier Transform (FFT)/Inverse Fast Fourier transform (IFFT) module has less complexity in calculation than the conventional time domain channel estimation, so the system delay caused by channel estimation can be reduced.

The channel estimation method according to the embodiments of the present invention comprises the following steps: step 1, a transmitting end transmits a time division pilot sequence having a cyclic prefix; step 2, a receiving end transforms the time division pilot sequence into frequency domain using a Fast Fourier Transform module, and performs channel estimation to obtain a channel frequency response estimation result; step 3, the receiving end transforms the channel frequency response estimation result back into time domain using a Inverse Fast Fourier Transform module, and obtains a channel impulse response estimation result.

Wherein, in step 1, the transmitting end can repeatedly transmit the time division pilot sequence having the cyclic prefix, and the following step is included between step 1 and step 2: averaging the time division pilot sequence received at the receiving end.

Wherein, in step 2, one or more of the following criterions are employed to perform channel estimation: Least Square criterion, Linear Minimum Mean Square Error (LMMSE) criterion, Minimum Mean Square Error (MMSE) criterion.

Wherein, when the length of the channel impulse response estimation result is larger than a maximum delay of the channel, the estimation value larger than the maximum delay of the channel among the channel impulse response estimation result is set to zero.

Wherein, the channel estimation method according to the embodiment of the present invention further comprises the following step: utilizing the channel impulse response estimation result to the time domain equalization process of the mobile communication system.

Alternatively, the channel estimation method according to the embodiment of the present invention further comprises the following step: transforming the channel impulse response estimation result back into frequency domain, and utilizing the transforming result to the frequency domain equalization process of the mobile communication system.

In the present invention, the linear convolution between the pilot sequence and the channel is transformed into the cyclic convolution between the pilot sequence and the channel by employing the pilot field format with added CP, thus the channel estimation in frequency domain can be performed based on FFT/IFFT module, the computation amount of the channel estimation in frequency domain is substantially less than that of the channel estimation in time domain. In addition, if the whole pilot field is comparatively long while the maximum delay of the channel is comparatively short, the pilot sequence with attached CP can be repeatedly transmitted several times. At the receiving end, the received pilot sequence is averaged (if the pilot sequence with attached CP is transmitted more than 2 times) to obtain an averaged received data of the pilot sequence, thus the effect of Gauss noise on the pilot sequence is reduced.

BRIEF DESCRIPTION OF THE DRAWINGS

The illustrated drawings herein provide a further understanding to the present invention and form a part of the application. The exemplary embodiments and the description thereof are intended to explain the present invention not limit the proper scope of the present invention, wherein.

DETAILED DESCRIPTION OF EMBODIMENTS

The detailed description of the embodiment of the present invention will be provided in connection with the drawings.

In order to perform channel estimation of the mobile communication system in frequency domain based on FFT/IFFT module, the most important problem is to transform the linear convolution between the pilot field and the channel into the cycle convolution between the pilot field and the channel. The present invention employs the processing method similar to that of the Orthogonal Frequency Division Multiplexing (OFDM) system, i.e., attaching a cyclic prefix (CP) in front of a pilot sequence. A pilot sequence is selected, wherein a plenty of frequency information is demanded in the pilot sequence because that Least Square (LS) Criterion, Linear Maximum Mean square error (LMMSE) Criterion, or Maximum Mean Square Error (MMSE) Criterion is required to be employed to perform channel estimation in frequency domain. That is to say, after the FFT transform, the value of zero is not allowed in the sampling sequence in frequency domain corresponding to the pilot sequence. Generally, the real or complex pseudo-random sequence has such feature. In prior art, the Chu sequence or the Newman sequence has closed-form expressions, and the amplitude of the sampling sequence in time domain and the sampling sequence in frequency domain corresponding to the time domain of the Chu sequence or the Newman sequence are constant, such sequence can prevent the Gauss noise from being amplified by the comparative small sampling amplitude in frequency domain in LS estimation. However, the Chu sequence and the Newman sequence are complex number sequences, thus an additional path of signal is required to transmit such pilots compared to the real pseudo-random sequence.

Figures 1, 2:
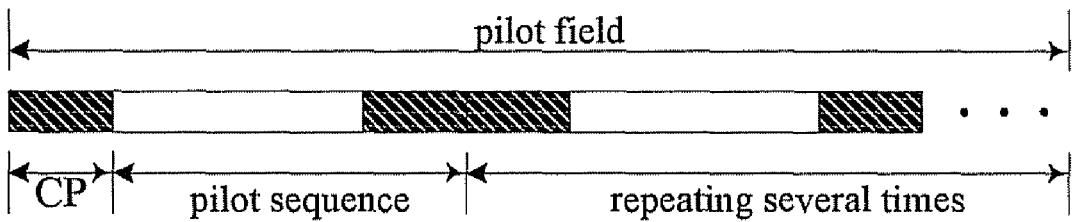
FIG. 1 is a schematic view of the principle of the time division pilot field employed in the channel estimation method according to the embodiment of the present invention.
FIG. 2 is a model diagram of the channel model of M.1225 vehicle-loaded channel A according to the embodiment of the present invention.

As shown in FIG. 1, setting the CP of the pilot sequence is not shorter than the maximum delay of the channel, if the length of the pilot field specified in the protocol is long enough, the pilot sequence with an attached CP will be transmitted several times consecutively and thus a pilot field will be formed. The repeatedly transmitted pilot sequence will be averaged to reduce the effect of Gauss noise on the precision of the channel estimation.

The channel estimation method according to the embodiment of the present invention is the channel estimation based on FFT/IFFT module; the processing method is similar to that in OFDM system. For the purpose of convenience, the present specification will refer to the terminologies in OFDM system, the frequency domain sampling signal derived by transforming the time domain pilot field of general mobile communication system is considered as the signal on an equivalent sub-carrier.

Assuming that at the transmitting end, the length of the pilot sequence is N, and the length of the set CP is 1, then the length of the pilot sequence attached with a CP is N+1 and is transmitted n times. The total length of the pilot field specified by the system is K, then the following equation exists:

$$n(N+1)=K \quad (1)$$

The receiving end sums the repeated pilot sequences correspondingly, then calculates the average value of the sum. From transmitting to receiving, various noise of the channel can be attributed to Gauss white noise; although there is limit to bandwidth, under the assumption of the Central Limit Theorem being satisfied, the sum of the various interferences greatly resembles Gauss white noise. If the Gauss white noise of each pilot sequence follows $(0,\sigma^2)$ distribution, after the averaging of n pilot sequences, the Gauss white noise of the derived average-value sequences follows $(0,\sigma^2/n)$ distribution.

Assuming that the sampling sequence R=[R(0), R(1),L R(N−1)] in frequency domain can be obtained from the received signal being transformed to frequency domain based on the FFT module. Wherein, N is the number of the equivalent sub-carriers in the communication system, also represents the length of the pilot sequence; the average value of the known pilot sequence is transformed into frequency domain to get the sequence $\bar{X}$=[$\bar{X}$(0), $\bar{X}$(1), L $\bar{X}$(N−1)]. The channel estimation in frequency domain based on LS criterion is, $$\hat{H}_{LS} = \frac{R}{\bar{X}} = \left[\frac{R(0)}{\bar{X}(0)}, \frac{R(1)}{\bar{X}(1)}, L, \frac{R(N-1)}{\bar{X}(N-1)}\right] \quad (2)$$

Wherein, $\hat{H}_{LS}$=[$\hat{H}_{LS}$(0), $\hat{H}_{LS}$(1), L, $\hat{H}_{LS}$(N−1)] represents the LS estimation of the frequency response of each equivalent sub-carrier in the communication system. If the channel estimation is done based on MMSE criterion, the computation amount is comparatively large, so LMMSE criterion with comparatively low complexity can be employed to approach the precision of MMSE channel estimation. Based on the Signal Noise-to-Ratio (SNR) of the channel, LMMSE estimation utilizes one LMMSE modification matrix to modify the result of LS channel estimation using the following computation method:

$$\hat{H}_{LMMSE} = R_{HH}\left(R_{HH} + \frac{n\beta}{SNR}I\right)^{-1}\hat{H}_{LS} \quad (3)$$

Wherein, $R_{HH}$=E{$HH^H$} is the expectancy of the self-correlating matrix of the channel impulse response, $\beta$=E{$|x_k|^2$}/E{$1/|x_k|^2$}, k=1, 2, L N−1 is the constant derived from the computation based on the transmitted pilot sequence $x_k$,k=1, 2, L N−1, and SNR is the Signal-to-Noise Ratio.

After the LS estimation or LMMSE (MMSE) estimation of the channel frequency response is obtained from the computation, the channel estimation will be transformed to time domain via IFFT module with a length of N. If N is larger than L, which is the maximum delay of the channel, the estimation value whose length is larger than L among the obtained result is set to zero, thus the error of the channel estimation will be further reduced, and the LS estimation and LMMSE (MMSE) estimation result of the channel impulse response will be obtained. The impulse response estimation can be directly applied to the time domain equalization of the communication system or the RAKE receiver, and it also can be applied to the frequency domain equalization of the communication system after being transformed back into frequency domain.

Figure 3:
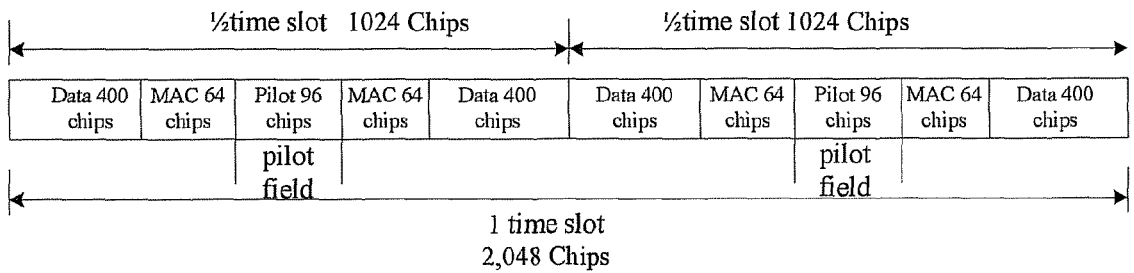
FIG. 3 is a schematic view of the frame format of the downlink channel physical layer specified in the High Rate Packet Data Protocol (HRPD)

A further embodiment will be provided to explain the channel estimation method according to the embodiment of the present invention. An simulation platform similar to that of High Rate Packet Data (HRPD) downlink is established as follows: the chip rate of the uncoded system is 1.2288 Mcps, and 16-order Walsh code spreaded spectrum is employed. The channel employs a M.1225 vehicle-loaded channel A simulation model, as shown in FIG. 2, the pilot field employs the complex pseudo-random sequence of a length of 16, the length of CP is set as 8, and the pilot sequence attached with CP is repeatedly transmitted 4 times, thus form a pilot field whose total length is 96. Note that, the length of the pilot field specified by HRPD is 96 chips. As shown in FIG. 3, in the frame format of the downlink channel physical layer specified in HRPD protocol, the pilot field is an all "1" chip sequence, after QPSK spreading module processing, the pilot field becomes a PN sequence of complex number. In order to satisfy the requirement on the setting of the pilot field, the portion of the pilot field corresponding to the complex pseudo-random sequence utilized in QPSK spreading is modified into the format same with the format with attached CP shown in FIG. 1. After QPSK spreading module processing, the all "1" pilot field will be transformed into the format required by the channel estimation method according to the embodiment of the present invention.

In order to compare the precision of channel estimation, the defined mean square error of the channel estimation is given below, $$MSE = E\left\{(1/N)\sum_{k=0}^{N-1}\left\{[H(k)-\hat{H}(k)]^*[H(k)-\hat{H}(k)]\right\}\right\} \quad (4)$$

Wherein, [ ]* represents the conjugate operator, N represents the number of the HRPD equivalent sub-carriers, also represents the length of FFT/IFFT. H(k), k=0, 1, L, N−1 is the real frequency response of the channel, and Ĥ(k), k=0, 1, L, N−1 is the estimated frequency response.

Figure 4:
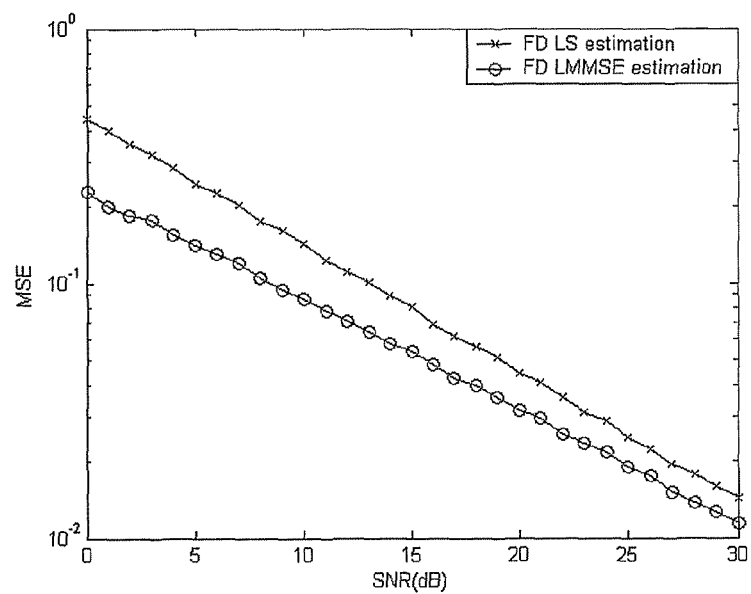
FIG. 4 is a schematic view of the mean square error obtained from the processing by the channel estimation method according to the embodiment of the present invention.

FIG. 4 shows the simulation result through the simulation platform, wherein, the Mean Square Error (MSE) curve represents the mean square error of the frequency response estimation of the channel in frequency domain, the Signal-to-Noise Ratio (SNR) is the SNR during the simulation. Curve of FD LS estimation and Curve of FD LMMSE estimation represents the result utilizing the LS estimation and the LMMSE estimation respectively in frequency domain. As shown in FIG. 4, when the computation complexity is less than that of the LS channel estimation in time domain, the LS channel estimation in frequency domain provides a more precise result. LMMSE estimation can further improve the channel estimation precision, and it facilitates to improve the performance of the CDMA equalization algorithm.

As a summary of the above description, the essence of the present invention is a channel estimation method based on the continuously transmitted time division pilot. The channel estimation in frequency domain for the single carrier system (e.g., CDMA system) is realized by employing the format of a pilot field attached with a cyclic prefix. For the pilot field attached with a CP, by utilizing the Least Square (LS) criterion, Linear Minimum Mean Square Error (LMMSE) criterion or Minimum Mean Square Error (MMSE) criterion for channel estimation, similar to that in OFDM, the channel estimation for single carrier system is carried out. In connection with the repeatedly transmitting pilot method used for channel estimation according to the embodiment of the present invention, the original calculation formula and the estimation steps of the LS, LMMSE and MMSE channel estimation in OFDM are modified, and the modified LS, LMMSE and MMSE algorithm can further improve the precision of channel estimation in frequency domain. While ensuring comparably high channel estimation precision, the modified algorithm can make the computation burden for channel estimation less than that of channel estimation in time domain with same performance. Moreover, in the CDMA system with similar to HRPD downlink channel, the frequency equalization (or in connection with interference and cancellation) algorithm is more suitable for user signal recovery, and facilitates the result of the channel estimation in frequency domain to be easily applied to frequency domain equalization receiving algorithm.

Above description is to illustrate the preferred embodiments not limit the present invention. Various alterations and changes to the present invention are apparent to those skilled in the art. The scope defined in claims shall comprise any modification, equivalent substitution and improvement in the spirit and principle of the present invention.

We claim:

1. A channel estimation method of a CDMA mobile communication system based on a time division pilot field comprising:
   transmitting of a time division pilot sequence having a cyclic prefix by a transmitting end;
   transforming the time division pilot sequence into a frequency domain using a Fast Fourier Transform module by a receiving end;
   performing channel estimation to obtain a channel frequency response estimation result;
   transforming the channel frequency response estimation result back into time domain by the receiving end using a Inverse Fast Fourier Transform module;
   obtaining a channel impulse response estimation result; and
   utilizing said channel impulse response estimation result to a time domain equalization process of the CDMA mobile communication system.

2. The channel estimation method according to claim 1 further comprising repeatedly transmitting the time division pilot sequence having the cyclic prefix by the transmitting end.

3. The channel estimation method according to claim 2 further comprising averaging the time division pilot sequence received at the receiving end.

4. The channel estimation method according to claim 1, 2 or 3 wherein the channel estimation is performed by using one or more of Least Square criterion, Linear Minimum Mean Square Error criterion, and Minimum Mean Square Error criterion.

5. The channel estimation method according to claim 1, 2 or 3 wherein when the length of the channel impulse response estimation result is larger than a maximum delay of the channel, the estimation value larger than the maximum delay of the channel among the channel impulse response estimation result is set to zero.

6. The channel estimation method according to claim 4 wherein when the length of the channel impulse response estimation result is larger than a maximum delay of the channel, the estimation value larger than the maximum delay of the channel among the channel impulse response estimation result is set to zero.

7. The channel estimation method according to claim 1, 2 or 3 further comprising transforming said channel impulse response estimation result back into frequency CDMA domain, and utilizing the transforming result to the frequency domain equalization process of the mobile communication system.

8. The channel estimation method according to claim 4 further comprising transforming the said channel impulse response estimation result back into frequency domain, and utilizing the transforming result to the frequency domain equalization process of the CDMA mobile communication system.

* * * * *